US010088637B2

(12) United States Patent
Ling

(10) Patent No.: US 10,088,637 B2
(45) Date of Patent: Oct. 2, 2018

(54) METHOD FOR MAKING OPTICAL FIBER CONNECTOR AND STRUCTURE THEREOF

(71) Applicant: Kow-Je Ling, Taipei (TW)

(72) Inventor: Kow-Je Ling, Taipei (TW)

( * ) Notice: Subject to any disclaimer, the term of this patent is extended or adjusted under 35 U.S.C. 154(b) by 71 days.

(21) Appl. No.: 15/163,707

(22) Filed: May 25, 2016

(65) Prior Publication Data

US 2016/0349462 A1 Dec. 1, 2016

(30) Foreign Application Priority Data

May 25, 2015 (TW) ............................ 104116613 A

(51) Int. Cl.

*G02B 6/36* (2006.01)
*G02B 6/38* (2006.01)
*G02B 6/32* (2006.01)
*B29D 11/00* (2006.01)

(52) U.S. Cl.

CPC ........ *G02B 6/3865* (2013.01); *B29D 11/0075* (2013.01); *B29D 11/00692* (2013.01); *B29D 11/00932* (2013.01); *G02B 6/32* (2013.01); *G02B 6/3863* (2013.01); *B29K 2995/0093* (2013.01); *G02B 6/3885* (2013.01)

(58) Field of Classification Search

CPC ...... G02B 6/3865; G02B 6/32; G02B 6/3863; G02B 6/3885; B29D 11/00692; B29D 11/0075; B29D 11/00932; B29K 2995/0093

USPC ........................................................... 385/78

See application file for complete search history.

(56) References Cited

U.S. PATENT DOCUMENTS

| | | | | |
|---|---|---|---|---|
| 2003/0031751 A1* | 2/2003 | Kikuchi | ............... | G02B 6/2552 425/392 |
| 2009/0298004 A1* | 12/2009 | Rizoiu | ................ | A61C 1/0046 433/29 |

FOREIGN PATENT DOCUMENTS

| | | |
|---|---|---|
| CN | 102436033 A | 5/2012 |
| CN | 102565954 B | 11/2015 |
| JP | 61-52609 A | 3/1986 |
| TW | 201305633 A | 2/2013 |

* cited by examiner

*Primary Examiner* — Jerry Blevins

(74) *Attorney, Agent, or Firm* — Bacon & Thomas, PLLC

(57) ABSTRACT

A method for making an optical fiber connector includes the following steps: Providing a casting mold having at least one casting cavity, and arranging at least one optical fiber assembly in the at least one casting cavity; Feeding plastic material into the at least one casting cavity; Solidifying the plastic material so as to form a plastic portion which solidifiedly bonds the at least one optical fiber assembly, where an end of the at least one optical fiber assembly emerges from the plastic portion, then removing a lower mold plate of the casting mold; Using a hard grinding disk to grind the end of the at least one optical fiber assembly; and Disposing the casting mold into an atomization facility, and atomizing lens material to the end of the at least one optical fiber assembly, acting with a manner of epicyclic gearing revolving therearound and with their own axes, so as to form a lens on the end of the at least one optical fiber assembly such that the lens is heated and solidified. Thereby, efficacy in producing optical fiber connectors can be improved. Also disclosed is a structure of the optical fiber connector, thus reliability of automated production of optical fiber connectors can be increased.

10 Claims, 15 Drawing Sheets

132 131 13 12 M1 111 113 T1 T2 A 1121 112 11

METHOD FOR MAKING OPTICAL FIBER CONNECTOR AND STRUCTURE THEREOF

CROSS REFERRENCE TO RELATED APPLICATION

This application claims the benefits of the Taiwan Patent Application Serial Number 104116613, filed on May 25, 2015, the subject matter of which is incorporated herein by reference.

BACKGROUND OF THE INVENTION

1. Field of the Invention

The present invention relates to a method for making an optical fiber connector and a structure of the optical fiber connector.

2. Description of Related Art

As the era is progressing, Internet technology has been developed and changed day after day. Various kinds of information transmitted and received through Internet have become an important source of intelligence. In particular, the Internet, with merits of its real-time characteristic, turns out to be one of the indispensable media for interpersonal relations and communication between politicians or between businesses.

Following a rapid growth of the amount of information, optical fiber cables have developed and played a role in connecting Internet facilities which serve as a medium of transmission. Along with popularization of Internet, Optical fiber cables have been employed through official services or huge organizations such as enterprises for business purposes, and down to personal usage.

No matter whether optical fiber cables are used by enterprises or personal, optical fiber connectors are essential to bond the optical fiber cables with relevant hardware facilities. In order to reduce the amount of consumption on information due to transmission through optical fiber cables, the approach on grinding ends of optical fibers becomes one of the critical issues for making optical fiber connectors.

Generally speaking, an optical fiber includes a bare fiber and a ferrule, wherein the ferrule may be of ceramic ferrule or plastic ferrule. The same Applicant, in Taiwan Patent No. I 442999, discloses a fixture for grinding ends of optical fibers, adapted for optical fibers having a ceramic ferrule or a plastic ferrule, in order to solve the problem that optical fibers are fractured easily upon grinding ends of optical fibers. Besides, grinding work such as coarse grinding or fine grinding can be undertaken such that optical fiber connectors can obtain more desirable light transmission and lower light loss.

However, in spite of the fact that the same Applicant attempts, in Taiwan Patent No. I 442999 applied for a fixture for grinding ends of optical fibers, to improve the fixture for grinding optical fiber connectors, the optical fiber connectors need to be disposed individually at the fixture for the grinding ends of optical fibers. As a result, the grinding work consumes labor and time.

To solve the above-mentioned problem, persistent research and experiments for a "Method for Making Optical Fiber Connector and Structure Thereof" have been undertaken, eventually resulting in accomplishment of the present invention. Such a method is characterized by using an optical fiber having a protective layer, a casting mold, and an atomization facility, for speeding up manufacturing processes of the optical fiber connectors. Besides, a grinding work, with incorporation of the fixture for grinding ends of optical fibers disclosed in Taiwan Patent No. I 442999, may be performed to improve efficacy in producing optical fiber connectors.

SUMMARY OF THE INVENTION

An object of the present invention is to provide a method for making an optical fiber connector so as to improve efficacy in producing optical fiber connectors.

Another object of the present invention is to provide a structure of the optical fiber connector such that reliability of automated production of optical fiber connectors can be increased.

The method for making an optical fiber connector, according to the present invention, comprises the following steps:

(A) Providing a casting mold having at least one casting cavity, and arranging at least one optical fiber assembly in the at least one casting cavity;

(B) Feeding plastic material into the at least one casting cavity;

(C) Solidifying the plastic material so as to form a plastic portion which solidifiedly bonds the at least one optical fiber assembly, where an end of the at least one optical fiber assembly emerges from the plastic portion, then removing a lower mold plate of the casting mold;

(D) Using a hard grinding disk to grind the end of the at least one optical fiber assembly; and (E) Disposing the casting mold into an atomization facility, and atomizing lens material to the end of the at least one optical fiber assembly so as to form a lens on the end of the at least one optical fiber assembly such that the lens is heated and solidified.

According to the present invention, in step (B), the plastic material may further include a first plastic layer and a second plastic layer formed, in sequence, in the at least one casting cavity, wherein the first plastic layer relates to a mixture of soft fiber and plastic, while the second plastic layer relates to a mixture of hard fiber and plastic so as to reinforce the strength of structure of the at least one optical fiber assembly.

Further, according to the present invention, in step (B), the plastic material may further include a first plastic layer, a second plastic layer, and a third plastic layer formed, in sequence, in the at least one casting cavity, wherein the first plastic layer and the third plastic layer relate to a mixture of soft fiber and plastic, while the second plastic layer relates to a mixture of hard fiber and plastic so as to reinforce the strength of structure of the at least one optical fiber assembly.

Still further, according to the present invention, step (C) further includes grinding the end of the at least one optical fiber assembly with a soft grinding disk, thereafter coating a layer of hydrophobic material on a surface of the plastic portion adjacent to the end of the at least one optical fiber assembly.

According to the present invention, the at least one optical fiber assembly may further include a protective layer, wherein either the at least one protective layer or the plastic material is made of hydrophobic material so as to facilitate the grinding work on the at least one optical fiber assembly.

Further, according to the present invention, in step (A), one aspect of the casting mold, having at least one casting cavity, may include a lower mold plate, a mold wall, and at least one upper plate. The lower mold plate includes a plurality of positioning pins, at least one positioning slot, and a protrusion. The at least one positioning slot has a positioning portion, and that the mold wall is provided above the protrusion. The at least one upper plate is provided on the mold wall, and includes at least one sprue and at least one optical fiber passage.

According to the present invention, the at least one casting cavity may further include a positioning unit provided on the positioning pins so as to increase an alignment effect for disposing optical fibers. The lower mold plate has a height smaller than a height of the protrusion so as to facilitate the grinding work.

Still further, according to the present invention, in step (A), another aspect of the casting mold, having at least one casting cavity, may include a lower mold plate, a mold wall, and at least one upper plate. The lower mold plate includes a plurality of positioning slots and a protrusion. The plural positioning slot each has a positioning portion, and that the mold wall is provided above the protrusion. The at least one upper plate is provided on the mold wall, and includes at least one sprue and at least one optical fiber passage.

According to the present invention, the least one casting cavity may further include a positioning unit, arranged on the mold wall, for enhancing an alignment effect for disposing optical fibers, and for increasing strength of optical fiber connectors. The lower mold plate has a height smaller than a height of the protrusion, and such a structure can facilitate the grinding work.

According to the present invention, in step (A), still another aspect of the casting mold, having at least one casting cavity, may include a lower mold plate, a trapezoidal mold wall, at least one upper plate, and at least one positioning unit. The lower mold plate includes a plurality of bottom positioning pins, of bottom positioning slots, and a bottom protrusion, where the bottom positioning slots each have a positioning portion. The trapezoidal mold wall is provided above the bottom protrusion. The at least one upper plate is provided on the trapezoidal mold wall, and includes a plurality of top positioning pins, at least one sprue, a top protrusion, and of top positioning slots. The top protrusion abuts against the trapezoidal mold wall, and that the top positioning slots each have a top positioning portion. The at least one position unit is arranged on the plural bottom positioning pins.

Further, according to the present invention, the lower mold plate has a height smaller than a height of the bottom protrusion, and that the at least one upper plate has a height smaller than a height of the top protrusion, and such a structure can facilitate the grinding work.

Still further, in step (E), according to the present invention, the atomization facility, provided with a hermetic space, comprises at least one atomization portion, at least one rotating table, and a monitor. The at least one atomization portion is arranged in and at the top of the atomization facility, and that the at least one rotating table is arranged in and at the bottom of the atomization facility. The monitor is arranged inside the atomization facility, and through detecting the weight of liquid atomized on the monitor, the thickness of liquid atomized on an end of the at least one optical fiber assembly can be monitored. Such an atomization facility can form a lens on an end of each individual optical fiber.

According to the present invention, the at least one rotating table may be of three rotating tables, which act with a manner of epicyclic gearing revolving therearound and with their own axes, so that the amount of atomization on each rotating table can be uniform. The atomization facility further includes a shutter located between the at least one atomization portion and the three rotating tables. The monitor can be fixedly arranged in the center of the three rotating tables for regulating the amount of atomization.

Further, according to the present invention, a structure of the optical fiber connector, made according to the method of the present invention, comprises: at least one plastic portion and at least one optical fiber assembly, wherein the at least one optical fiber assembly is bonded with the at least one plastic portion. The at least one optical fiber assembly includes a bare fiber, a protective layer, and at least one lens. The protective layer envelops the bare fiber, and that the bare fiber emerges, at two ends, from the protective layer, respectively. The bare fiber has its at least one end bonded with the at least one lens, such that the at least one optical fiber assembly has its at least one end had at least one lens. The at least one optical fiber assembly has its two ends emerged from the at least one plastic portion.

According to the present invention, the optical fiber connector may further comprise a positioning unit bonded with the at least one plastic portion and anchoring the at least one optical fiber assembly. The positioning unit may be made either of metal, plastic, or ceramic.

Further, according to the present invention, the at least one plastic portion includes a first plastic portion and a second plastic portion, which are bonded with the at least one optical fiber assembly, respectively. The at least one optical fiber assembly, bonded with the first plastic portion, has its bare fiber integrally and correspondingly connected with a bare fiber of each of the at least one optical fiber assembly, respectively, bonded with the second plastic portion.

Still further, according to the present invention, the at least one plastic portion includes a first plastic portion, a second plastic portion, and a third plastic portion. The first plastic portion is bonded with at least two optical fiber assemblies, the second plastic portion with at least one optical fiber assembly, and the third plastic portion with at least one optical fiber assembly. A bare fiber of each of the at least two optical fiber assemblies, bonded with the first plastic portion, is integrally and correspondingly connected with a bare fiber of the at least one optical fiber assembly bonded with the second plastic portion, respectively, and with a bare fiber of the at least one optical fiber assembly bonded with the third plastic portion, respectively.

According to the present invention, the at least one plastic portion includes a first plastic portion, a second plastic portion, a third plastic portion, and a fourth plastic portion. The first plastic portion is bonded with at least four optical fiber assemblies, the second plastic portion with at least one optical fiber assembly, the third plastic portion with at least one optical fiber assembly, and the fourth plastic portion with at least two optical fiber assemblies. A bare fiber of each of the at least four optical fiber assemblies, bonded with the first plastic portion, is integrally and correspondingly connected with a bare fiber of the at least one optical fiber assembly bonded with the second plastic portion, and with a bare fiber of the at least one optical fiber assembly bonded with the third plastic portion, and with a bare fiber each of the at least two optical fiber assemblies bonded with the fourth plastic portion.

Further, according to the present invention, the at least one plastic portion includes a first plastic portion, a second plastic portion, a third plastic portion, a fourth plastic portion, and a fifth plastic portion. The first plastic portion is bonded with at least four optical fiber assemblies, the second plastic portion with at least one optical fiber assembly, the third plastic portion with at least one optical fiber assembly, the fourth plastic portion with at least one optical fiber assembly, and the fifth plastic portion with at least one optical fiber assembly. A bare fiber of each of the at least four optical fiber assemblies, bonded with the first plastic portion, is integrally and correspondingly connected with a bare fiber of the at least one optical fiber assembly bonded with the second plastic portion, and with a bare fiber of the at least one optical fiber assembly bonded with the third plastic portion, and with a bare fiber of the at least one optical fiber assembly bonded with the fourth plastic portion, and with a bare fiber of the at least one optical fiber assembly bonded with the fifth plastic portion.

Still further, the at least one plastic portion, corresponding to the end of the at least one optical fiber assembly where the lens is formed, is formed with at least one engaging concave portion. The positioning unit may further include at least one slot formed with the at least one engaging concave portion. The plastic portion is bonded with at least two optical fiber assemblies, wherein each of the optical fiber assemblies of at least one end of the at least one plastic portion has at least one lens emerged therefrom.

According to the present invention, the at least one plastic portion is bonded with at least two optical fiber assemblies, wherein each of the optical fiber assemblies of at least one end of the at least one plastic portion has at least one lens emerged therefrom. The at least one plastic portion, at two ends, has at least two lenses emerged therefrom, respectively. A span between the at least two lenses at one side of the at least one plastic portion is different from a span between the at least two lenses at another side of the at least one plastic portion.

Further, according to the present invention, the optical fiber connector may further comprise at least one upper plate bonded with the at least one plastic portion, and that either the at least one plastic portion or the protective layer is made of hydrophobic material.

Still further, according to the present invention, the at least one plastic portion of the optical fiber connector may further include a first plastic layer and a second plastic layer, wherein the first plastic layer may relate to a mixture of soft fiber and plastic, while the second plastic layer to a mixture of hard fiber and plastic.

According to the present invention, the at least one plastic portion of the optical fiber connector may further include a first plastic layer, a second plastic layer, and a third plastic layer, wherein the first plastic layer and the third plastic layer relate to a mixture of soft fiber and plastic, while the second plastic layer relates to a mixture of hard fiber and plastic.

Further, according to the present invention, the at least one plastic portion of the optical fiber connector may be bonded, at an end adjacent to the lens, with a layer of hydrophobic material, and that a distance between the layer of hydrophobic material and the protective layer is less than or equal to 5 mm.

Other objects, advantages, and novel features of the present invention will become more apparent from the following detailed descriptions when taken in conjunction with the accompanying drawings.

DETAILED DESCRIPTION OF THE PREFERRED EMBODIMENTS

Figure 1:
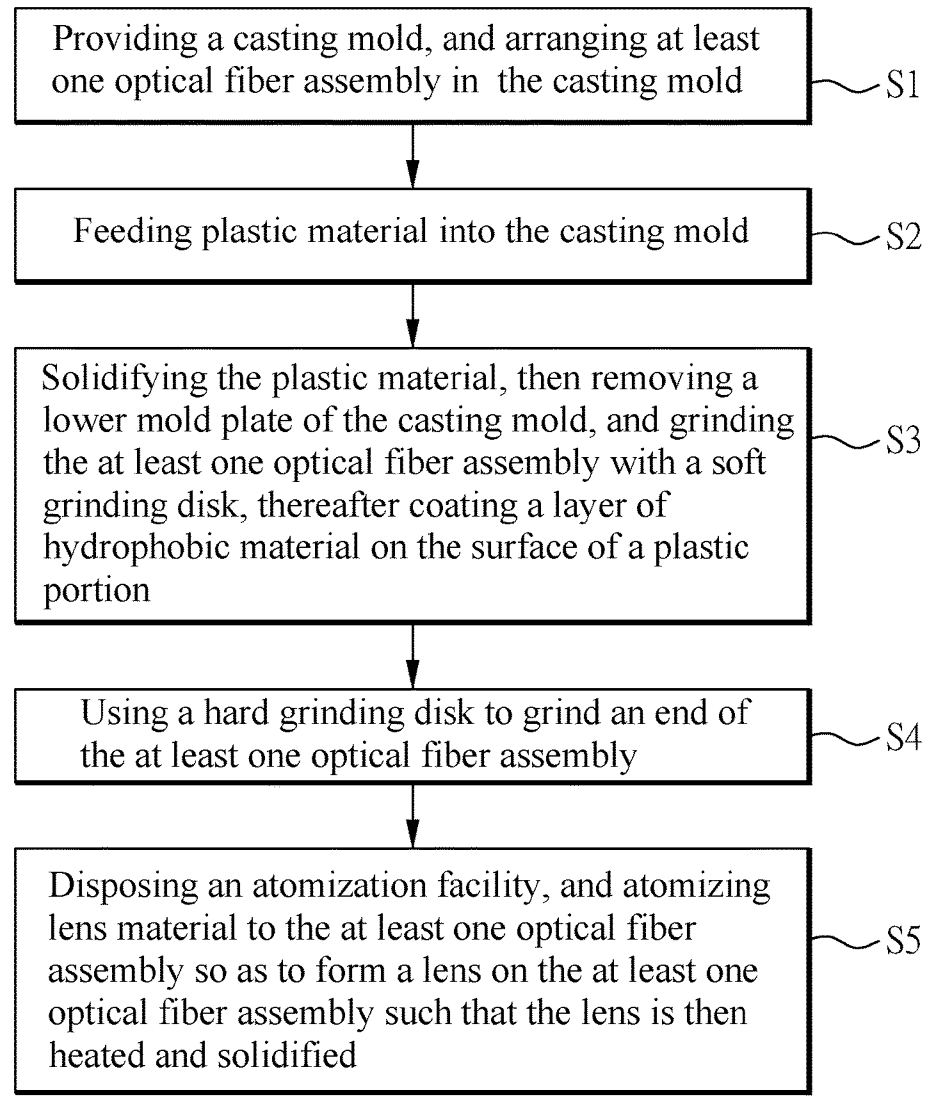
FIG. 1 is a flowchart illustrating a method for making optical fiber connectors according to the present invention.

Referring to FIG. 1, a flowchart illustrating a method for making optical fiber connectors according to the present invention, the method comprises the following steps:

(S1) Providing a casting mold having a plurality of casting cavities, and arranging at least one optical fiber assembly in each of the casting cavities;

(S2) Feeding plastic material into the casting cavities;

(S3) Solidifying the plastic material so as to form a plastic portion which solidifiedly bonds the at least one optical fiber assembly, where an end of the at least one optical fiber assembly emerges from the plastic portion, then removing a lower mold plate of the casting mold and grinding the end of the at least one optical fiber assembly with a soft grinding disk, thereafter coating a layer of hydrophobic material on a surface of the plastic portion adjacent to the end of the at least one optical fiber assembly;

(S4) Using a hard grinding disk to grind the end of the at least one optical fiber assembly; and (S5) Disposing the casting mold into an atomization facility, and atomizing lens material to the end of the optical fiber assembly so as to form a lens on the end of the optical fiber assembly such that the lens is heated and solidified.

A detailed description will be given hereunder regarding the casting mold, the atomization facility, and a structure of the optical fiber connector being formed.

Figure 2A:
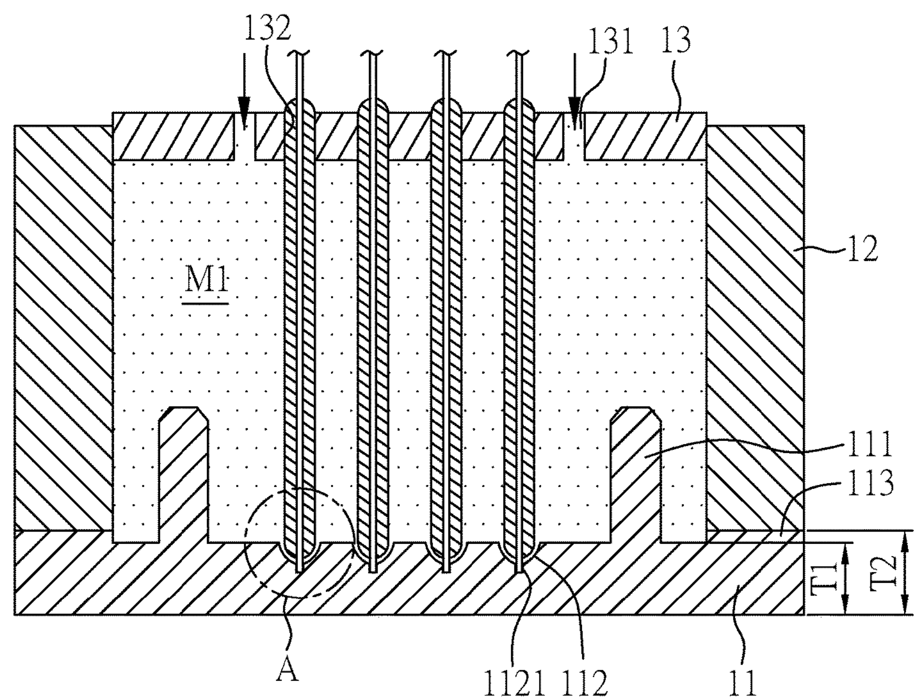
FIG. 2A is a cross-sectional view illustrating casting formation of a first embodiment of a casting mold according to the present invention.
Figure 2B:
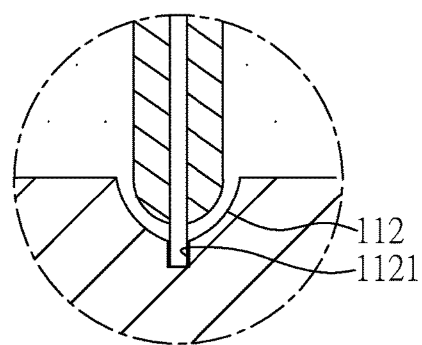
FIG. 2B is an enlarged view illustrating a structure circled and denoted with A in FIG. 2A.
Figure 2C:
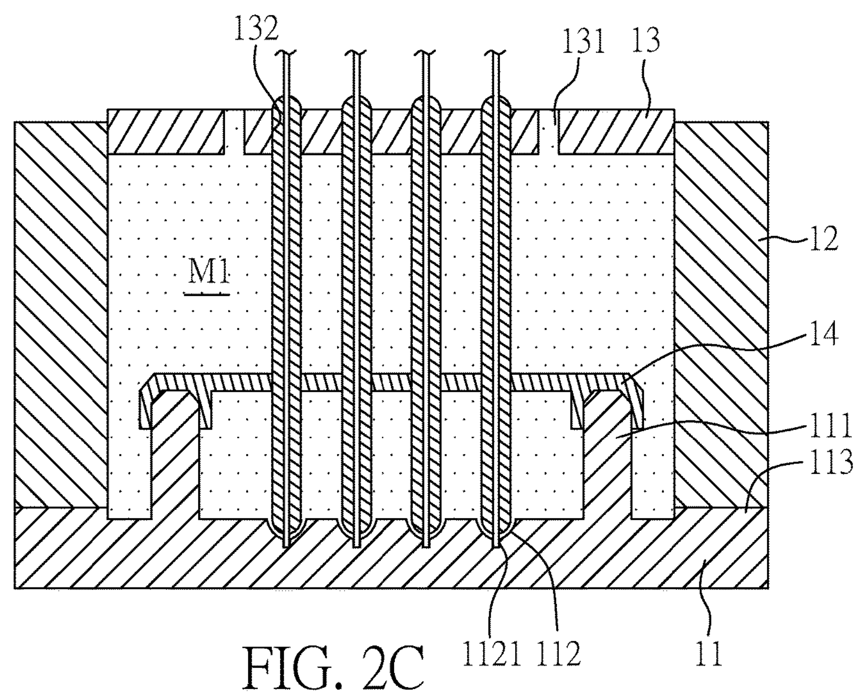
FIG. 2C is a schematic view illustrating a positioning unit arranged in FIG. 2A.

References are made to FIG. 2A, a cross-sectional view illustrating casting formation of a first embodiment of the casting mold according to the present invention; FIG. 2B, an enlarged view illustrating a structure circled and denoted with A in FIG. 2A; FIG. 2C, a schematic view illustrating a positioning unit arranged in FIG. 2A; and FIG. 2D, a schematic view illustrating a casting product, not ground yet, as shown in FIG. 2A. For a ready explanation, only one of the casting cavities of the casting mold is shown.

In the first embodiment of the casting mold, according to the present invention, the casting mold includes a lower mold plate 11, a mold wall 12, an upper plate 13, and a positioning unit 14. The lower mold plate 11 includes a plurality of positioning pins 111, a plurality of positioning slots 112, and a protrusion 113. Each of the positioning slots 112 have a positioning portion 1121, and that the mold wall 12 is provided above the protrusion 113. The upper plate 13 is provided on the mold wall 12, and includes a plurality of sprues 131 and of optical fiber passages 132. A casting cavity M1 relates to a space defined by the lower mold plate 11, the mold wall 12, and the upper plate 13. The protrusion 113 and the lower mold plate 11 relate to an integrally-made structure. In spite of the fact that FIG. 2A shows the protrusion 113 appeared both at the right-hand side and the left-hand side, the protrusion 113 at both sides is in fact interconnected as far as a three-dimensional structure is concerned. The upper plate 13 may be made of plastic, metallic, or ceramic material.

The positioning unit 14, as shown in FIG. 2C, can provide a more accurate alignment for disposing optical fibers, and reinforce strength of structure for the optical fibers disposed in optical fiber connectors, let alone the number of usage for plug-in and plug-out of optical fiber connectors can be increased.

The lower mold plate 11 has a height T1 smaller than a height T2 of the protrusion 113, so that after removing the lower mold plate 11 and with a grinding work proceeded thereafter, the mold wall 12 will not contact with a grinding surface and that a status of easy grinding can be obtained.

Figure 2D:
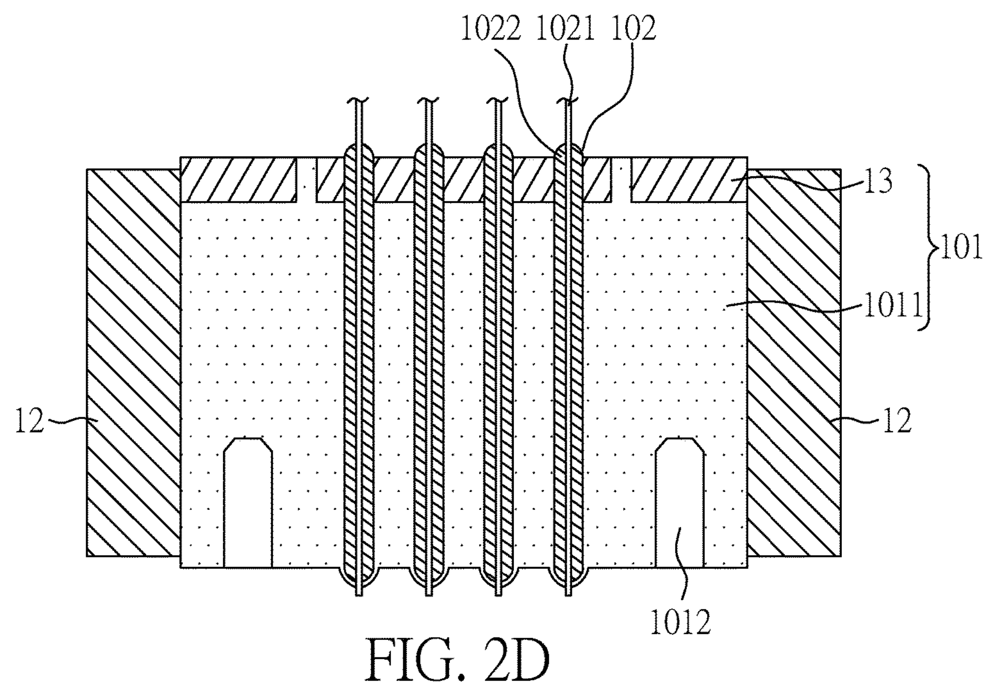
FIG. 2D is a schematic view illustrating a casting product, not ground yet, as shown in FIG. 2A.

As shown in FIG. 2D, the not-yet ground casting product, in the first embodiment of the casting mold, includes a plastic assembly 101, a plurality of optical fiber assemblies 102, and a mold wall 12. The plastic assembly 101 includes a plastic portion 1011 and an upper plate 13, where the plastic portion 1011 is formed with two concave portions 1012. The plural optical fiber assemblies 102 are disposed in the plastic assembly 101, where the optical fiber assemblies 102 each include a bare fiber 1021 and a protective layer 1022. The upper plate 13 turns out to be a part of the casting product.

Figure 3A:
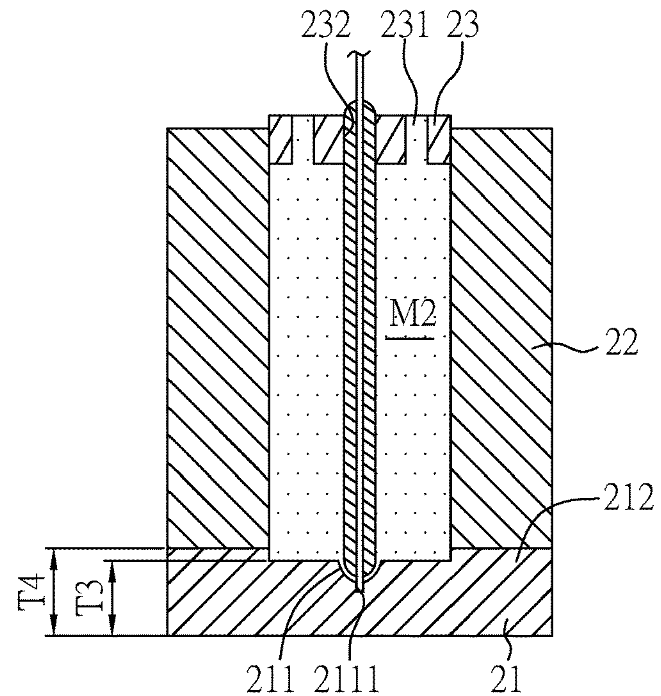
FIG. 3A is a cross-sectional view illustrating casting formation of a second embodiment of the casting mold according to the present invention.
Figure 3B:
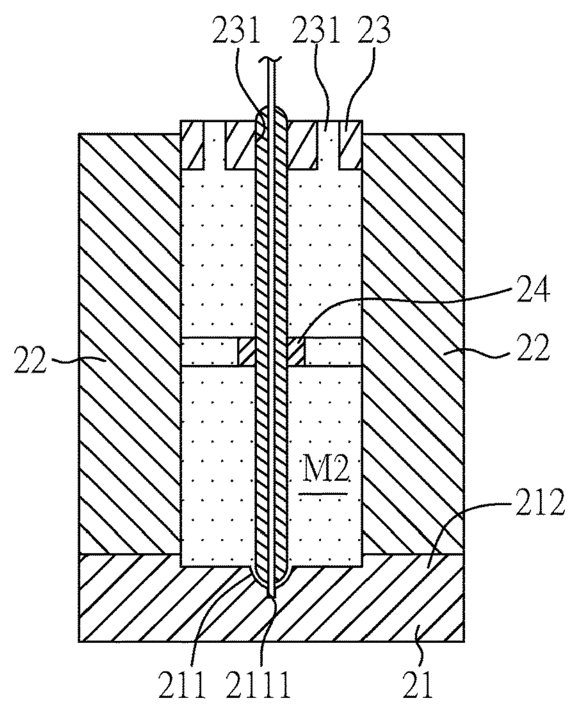
FIG. 3B is a schematic view illustrating a positioning unit arranged in FIG. 3A.
Figure 3C:
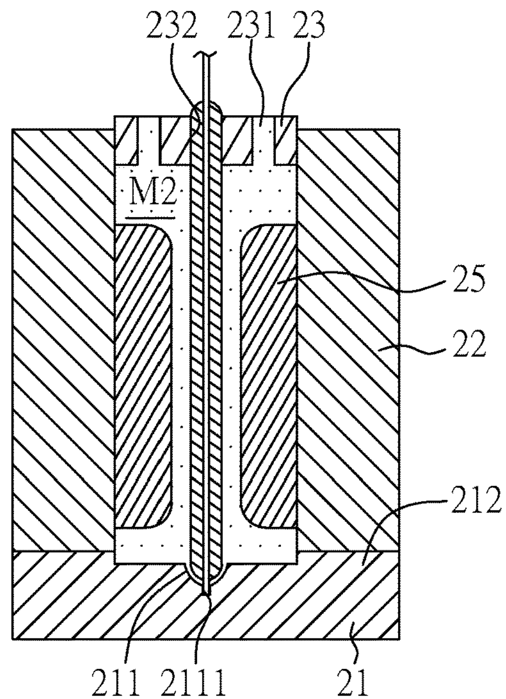
FIG. 3C is a schematic view illustrating another positioning unit arranged in FIG. 3A.

Now references are made to FIG. 3A, a cross-sectional view illustrating casting formation of a second embodiment of the casting mold according to the present invention; FIG. 3B, a schematic view illustrating a positioning unit arranged in FIG. 3A; FIG. 3C, a schematic view illustrating another positioning unit arranged in FIG. 3A; and FIG. 3D, a schematic view illustrating a casting product, not ground yet, as shown in FIG. 3A. For a ready explanation, only one of the casting cavities of the casting mold is shown.

In the second embodiment of the casting mold, according to the present invention, the casting mold includes a lower mold plate 21, a mold wall 22, an upper plate 23, and a positioning unit 24. The lower mold plate 21 includes a positioning slot 211 and a protrusion 212, where the positioning slot 211 has a positioning portion 2111. The mold wall 22 is provided above the protrusion 212. The upper plate 23 is provided on the mold wall 22, and includes a plurality of sprues 231 and of optical fiber passages 232. A casting cavity M2 relates to a space defined by the lower mold plate 21, the mold wall 22, and the upper plate 23. The protrusion 212 and the lower mold plate 21 relate to an integrally-made structure. In spite of the fact that FIG. 3A shows the protrusion 212 appeared both at the right-hand side and the left-hand side, the protrusion 212 at both sides is in fact interconnected as far as a three-dimensional structure is concerned. The upper plate 23 may be made of plastic, metallic, or ceramic material.

The positioning unit 24, as shown in FIG. 3B, can provide a more accurate alignment for disposing optical fibers, and reinforce strength of structure for the optical fibers disposed in optical fiber connectors, let alone the number of usage for plug-in and plug-out of optical fiber connectors can be increased. The positioning unit 25, as shown in FIG. 3C, can be used for replacing casting plastic material, and serve as a part of the optical fiber connector, and reinforce strength of structure of the optical fiber connector.

In the second embodiment of the casting mold, the lower mold plate 21 has a height T3 which is smaller than a height T4 of the protrusion 212, so that after removing the lower mold plate 21 and with a grinding work proceeded thereafter, the mold wall 22 will not contact with a grinding surface and that a status of easy grinding can be obtained.

Figure 3D:
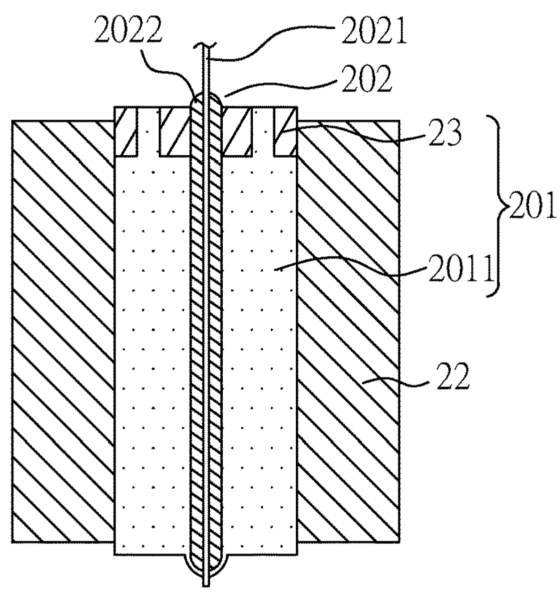
FIG. 3D is a schematic view illustrating a casting product, not ground yet, as shown in FIG. 3A.

As shown in FIG. 3D, the not-yet ground casting product, in the second embodiment of the casting mold, includes a plastic assembly 201, an optical fiber assembly 202, and a mold wall 22. The plastic assembly 201 includes a plastic portion 2011 and an upper plate 23. The optical fiber assembly 202 is disposed in the plastic assembly 201, where the optical fiber assembly 202 includes a bare fiber 2021 and a protective layer 2022. The upper plate 23 turns out to be a part of the casting product.

Figure 4:
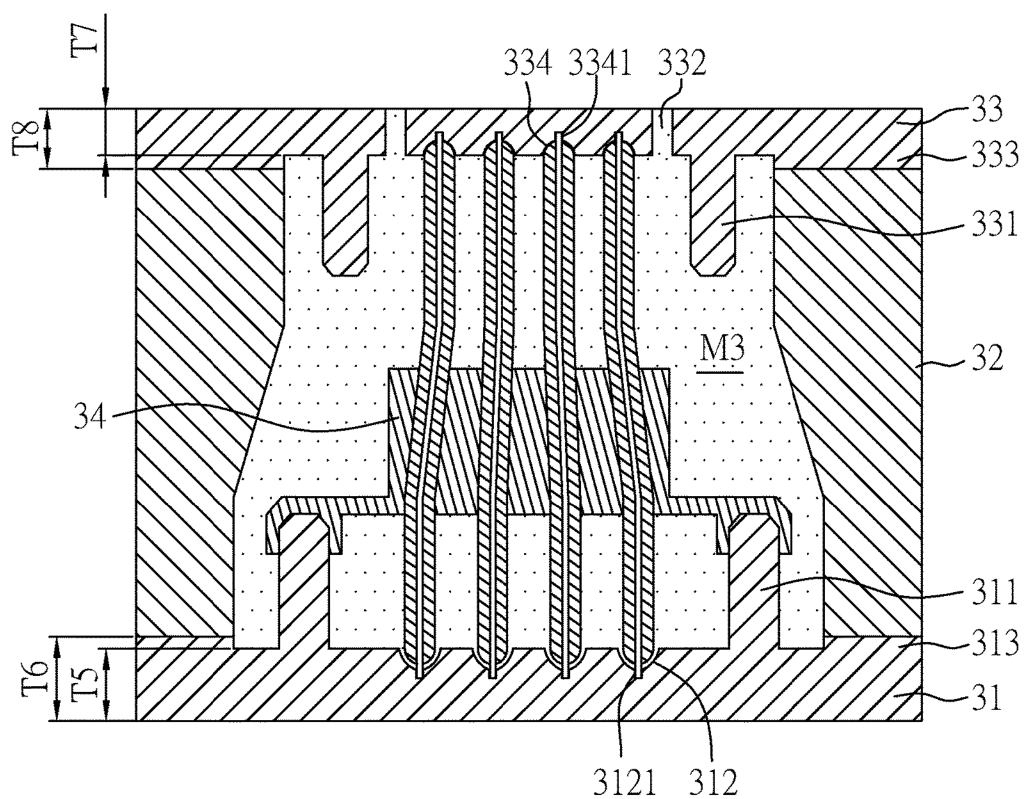
FIG. 4 is a cross-sectional view illustrating casting formation of a third embodiment of the casting mold according to the present invention.

Further, a reference is made to FIG. 4, a cross-sectional view illustrating casting formation of a third embodiment of the casting mold according to the present invention. For a ready explanation, only one of the casting cavities of the casting mold is shown.

In the third embodiment of the casting mold, according to the present invention, the casting mold includes a lower mold plate 31, a trapezoidal mold wall 32, an upper plate 33, and a positioning unit 34. The lower mold plate 31 includes a plurality of bottom positioning pins 311, of bottom positioning slots 312, and a bottom protrusion 313, where the bottom positioning slots 312 each have a positioning portion 3121. The trapezoidal mold wall 32 is provided above the bottom protrusion 313. The upper plate 33 is provided on the trapezoidal mold wall 32, and includes a plurality of top positioning pins 331, of sprues 332, a top protrusion 333, and of top positioning slots 334. The top protrusion 333 abuts against the trapezoidal mold wall 32, and that the top positioning slots 334 each have a top positioning portion 3341. The positioning unit 34 is arranged on the plural bottom positioning pins 311.

A casting cavity M3 relates to a space defined by the lower mold plate 31, the trapezoidal mold wall 32, and the upper plate 33. The bottom protrusion 313 and the lower mold plate 31 relate to an integrally-made structure, and so do the top protrusion 333 and the upper plate 33. In spite of the fact that FIG. 3A shows both the bottom protrusion 313 and the top protrusion 333 appeared at the right-hand side and the left-hand side, the bottom protrusion 313 at both sides is in fact interconnected as far as a three-dimensional structure is concerned, and so is the top protrusion 333. The positioning unit 34 can provide a more accurate alignment for disposing optical fibers, and reinforce strength of structure for the optical fibers disposed in optical fiber connectors, let alone the number of usage for plug-in and plug-out of optical fiber connectors can be increased.

The lower mold plate 31 has a height T5 smaller than a height T6 of the bottom protrusion 313, and that the upper plate 33 has a height T7 smaller than a height T8 of the top protrusion 333, so that after removing the lower mold plate 31 and with a grinding work proceeded thereafter, the mold wall 32 will not contact with a grinding surface and that a status of easy grinding can be obtained.

Figure 5A:
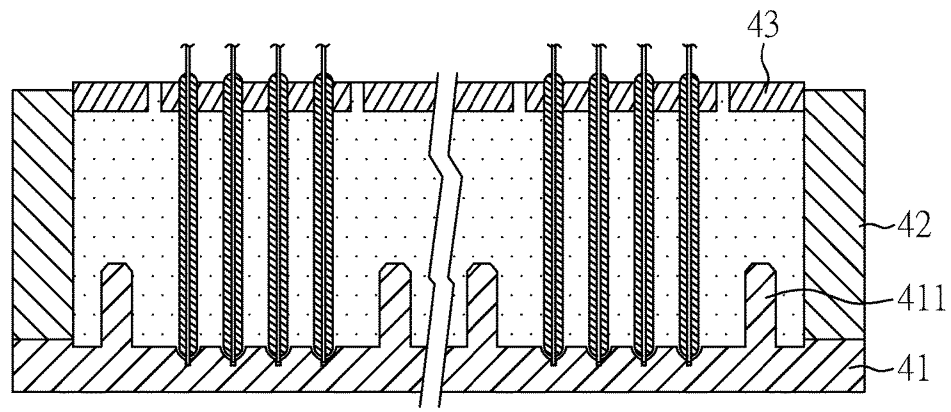
FIG. 5A is a cross-sectional view illustrating casting formation of a fourth embodiment of the casting mold according to the present invention.
Figure 5B:
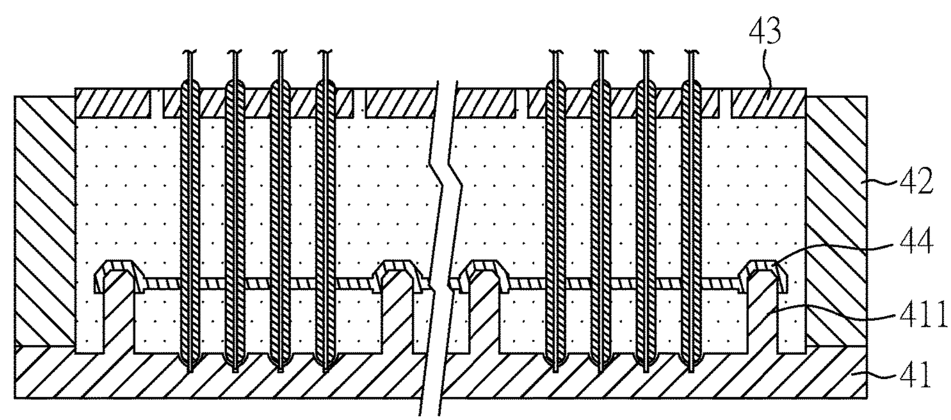
FIG. 5B is a schematic view illustrating a positioning unit arranged in FIG. 5A.

Further references are made to FIG. 5A, a cross-sectional view illustrating casting formation of a fourth embodiment of the casting mold according to the present invention; and FIG. 5B, a schematic view illustrating a positioning unit arranged in FIG. 5A. For a ready explanation, only one of the casting cavities of the casting mold is shown.

In the fourth embodiment of the casting mold, according to the present invention, the casting mold includes a lower mold plate 41 having a plurality of positioning pins 411, a mold wall 42, an upper plate 43, and a positioning unit 44. The casting mold is characterized by increasing a space of casting in a casting cavity such that the casting cavities each can contain at least two optical fiber connectors, and after formation of the optical fiber connectors, individual products can be perfected and separated only by a cutting work therebetween. The casting mold of this embodiment relates to an extended application of the casting mold of the first embodiment for which only one optical fiber connector is formed. The positioning unit 44 shown in FIG. 5B has the same function as that of the position units mentioned above, and thus no need for redundant description.

Figure 6:
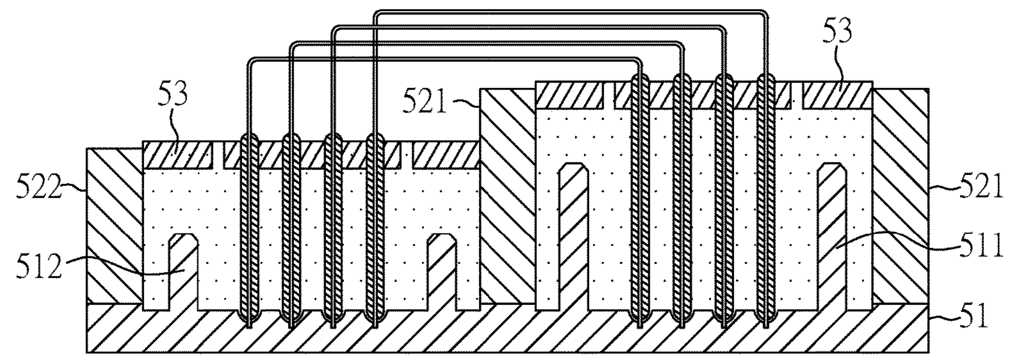
FIG. 6 is a cross-sectional view illustrating casting formation of a fifth embodiment of the casting mold according to the present invention.

Referring to FIG. 6, a cross-sectional view illustrating casting formation of a fifth embodiment of the casting mold according to the present invention, only a casting mold with a construction of two casting cavities is shown for a ready explanation.

In the fifth embodiment of the casting mold, according to the present invention, the casting mold includes a lower mold plate 51 having a plurality of positioning pins 511, 512, a plurality of mold walls 521, 522, and of upper plates 53. The casting mold is characterized by utilizing differences in height for the plural positioning pins 511, 512 and the plural mold walls 521, 522, so that two interconnected optical fiber connectors of different dimensions can be made in one single molding. As such, the casting mold of this embodiment also relates to an extended application of the casting mold of the first embodiment.

Figure 7:
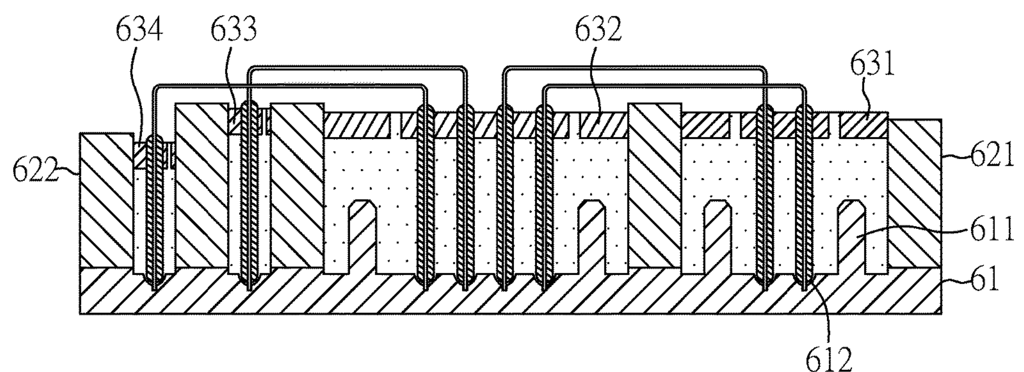
FIG. 7 is a cross-sectional view illustrating casting formation of a sixth embodiment of the casting mold according to the present invention.

Further referring to FIG. 7, a cross-sectional view illustrating casting formation of a sixth embodiment of the casting mold according to the present invention, a casting mold with a construction of four casting cavities is shown.

In the six embodiment of the casting mold, according to the present invention, the casting mold includes a lower mold plate 61 having a plurality of positioning pins 611 and of positioning slots 612, a plurality of mold walls 621, 622, and of upper plates 631, 632, 633, 634. The casting mold is characterized by utilizing various number of the positioning pins 611 and positioning slots 612 of the lower mold plate 61 in casting cavities, with incorporation of differences in height for the mold walls 621, 622 and differences in dimension for the plural upper plates 631, 632, 633, 634, so that four interconnected optical fiber connectors of different dimensions can be made in one single molding. As such, the casting mold of this embodiment relates to an extended application of the casting mold of the first embodiment and of the casting mold of the second embodiment.

Figure 8:
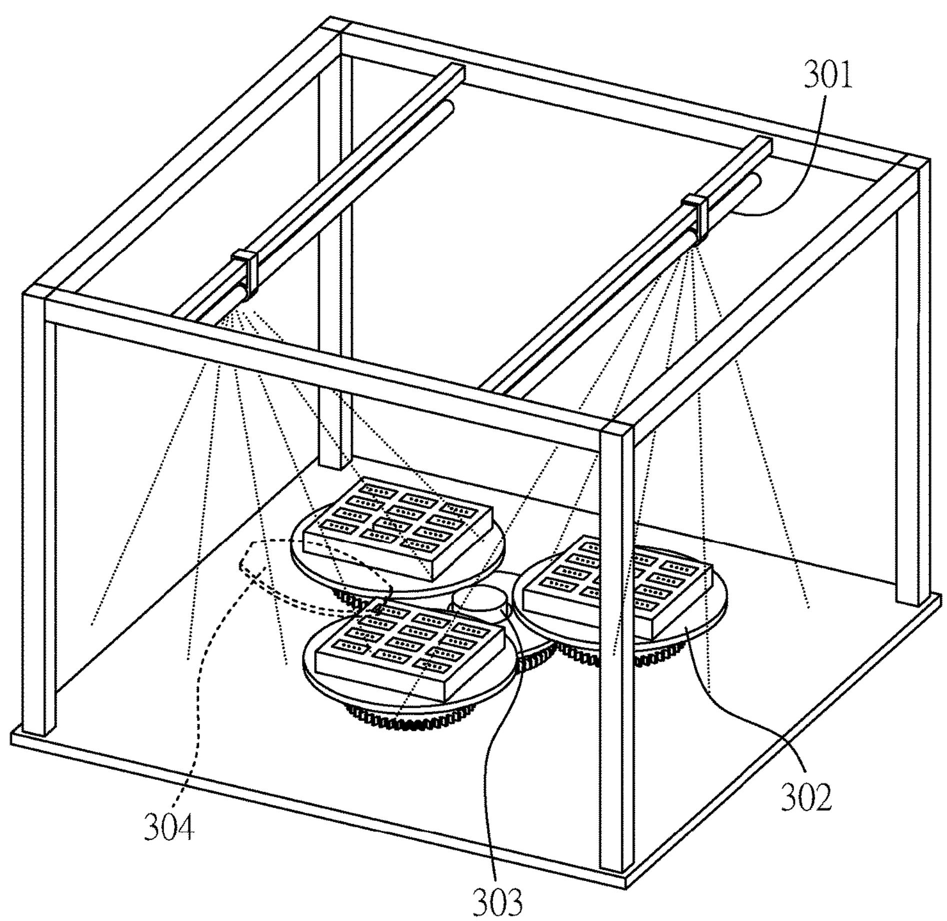
FIG. 8 is a schematic view illustrating an atomization facility according to the present invention.

Now referring to FIG. 8, a schematic view illustrating an atomization facility according to the present invention, the atomization facility 30, provided with a hermetic space, comprises two atomization portions 301, three rotating tables 302, a monitor 303, and a shutter 304. The two atomization portions 301 are arranged in and at the top of the atomization facility 30, and that the three rotating tables 302 are arranged in and at the bottom of the atomization facility 30. The monitor 303 is arranged inside the atomization facility 30 and in the center of the three rotating tables 302, and through the weight of liquid atomized on the monitor 303, the thickness of liquid atomized on ends of the optical fiber assemblies can be monitored.

According to the present invention, the shutter 304 of the atomization facility 30 can regulate the amount of atomization atomized toward the three rotating tables 302, where the three rotating tables 302 revolve as an epicyclic gear train revolving therearound and with their own axes, so that each optical fiber assembly in the casting molds will have the same amount of atomization for their end.

Figure 9A:
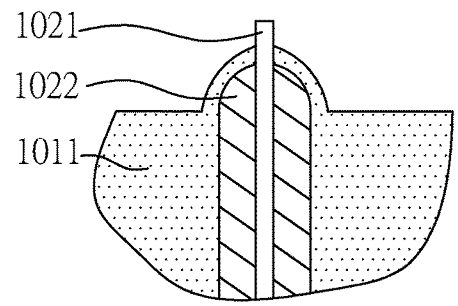
FIGS. 9A to 9E are schematic views illustrating processes for working an end of an optical fiber assembly of the not-yet ground product of the first embodiment of the casting mold according to the present invention.
Figure 9B:
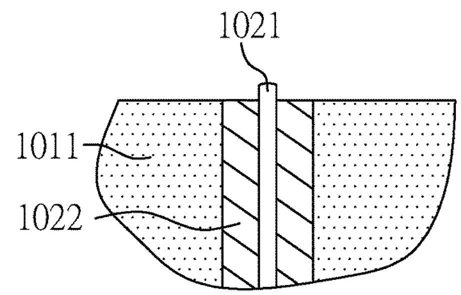
Figure 9C:
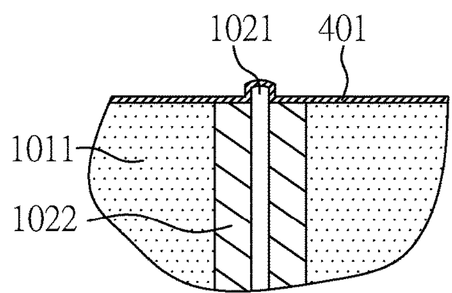

Now referring to FIGS. 9A to 9E, schematic views illustrating processes for working an end of the optical fiber assembly of the not-yet ground product of the first embodiment of the casting mold according to the present invention; incorporated with FIG. 2A and FIG. 2D, illustrating the casting mold and the casting product of the first embodiment, and FIG. 8, illustrating the atomization facility 30; the method for making optical fiber connector, according to the present invention, is detailed as follows:

First, in step S1, providing a casting mold, and arranging at least one optical fiber assembly 102 in the casting mold; then in step S2, feeding plastic material into the casting mold; thereafter in step S3, solidifying the plastic material, and removing a lower mold plate 11 of the casting mold, then grinding the at least one optical fiber assembly 102 with a soft grinding disk, and coating a layer 401 of hydrophobic material on the surface of a plastic portion 1011. FIG. 9A shows an original state of an end of the at least one optical fiber assemble 102, after formation in the casting mold and removal of the lower mold plate 11 of the casting mold, revealing a bare fiber 1021, a protective layer 1022, and a plastic portion 1011. FIG. 9B shows a status after disposing the casting mold into a grinding facility and grinding the bare fiber 1021 with a soft grinding disk. FIG. 9C shows a status of coating the layer 401 of hydrophobic material on the surface after which being ground by the soft grinding disk.

Figure 9D:
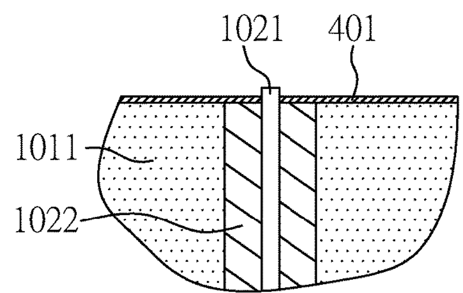

According to the present invention, after coating the layer 401 of hydrophobic material, proceeding with step S4 in the grinding facility by using a hard grinding disk to grind an end of the at least one optical fiber assembly 102, removing the layer 401 of hydrophobic material at an end of the bare fiber 1021 so as to emerge the end of the bare fiber 1021, such that the status of FIG. 9D can be shown. Eventually, step S5 is performed, disposing an atomization facility 30, and atomizing lens material to the at least one optical fiber assembly 102 so as to form a lens 402 on the at least one optical fiber assembly 102 such that the lens 402 is then heated and solidified.

Figure 9E:
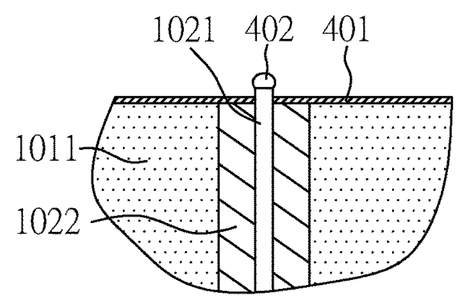

Further, according to the present invention, since the bare fiber 1021, except for its end, relates to a layer 401 of hydrophobic material, the atomized liquid will form, at the end of the bare fiber 1021, with a round lens 402 for focusing light, as a sate shown in FIG. 9E. Besides, since the rotating tables 302 of the atomization facility 30 act with a manner of epicyclic gearing revolving therearound and with their own axes, the end of each bare fiber 1021 in the casting mold will be atomized uniformly. Then the monitor 303 detects the weight of liquid atomized on the monitor 303. As such, whether the round lens 402 has a thickness relating to a predetermined thickness of lens can be ensured. Eventually, the lens 402 will be heated and solidified, and thus a product of optical fiber connector can be acquired.

Figure 10A:
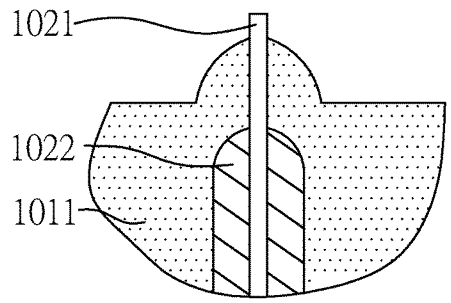
FIGS. 10A to 10E are schematic views illustrating processes for working another end of the optical fiber assembly of the not-yet ground product of the first embodiment of the casting mold according to the present invention.
Figure 10B:
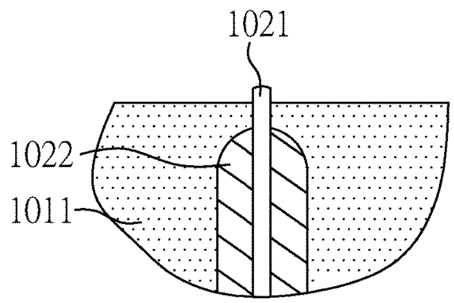
Figure 10C:
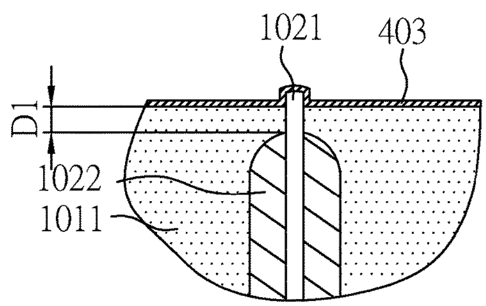

Now references are made to FIGS. 10A-10E, schematic views illustrating processes for working another end of the optical fiber assembly of the not-yet ground product of the first embodiment of the casting mold according to the present invention, incorporated with FIG. 2A and FIG. 2D, illustrating the casting mold and the casting product of the first embodiment, and FIG. 8, illustrating the atomization facility 30; the method for making optical fiber connector, according to the present invention, is detailed as follows:

FIG. 10A shows an original state of an end of each optical fiber assemble 102, after formation in the casting mold and removal of the lower mold plate 11 of the casting mold, revealing a bare fiber 1021, a protective layer 1022, and a plastic portion 1011. FIG. 10B shows a status after disposing the casting mold into a grinding facility and grinding the bare fiber 1021 with a soft grinding disk. FIG. 10C shows a status of coating a layer 403 of hydrophobic material on the surface after which being ground by the soft grinding disk. Such is featured in that a distance between the protective layer 1022 and the layer 403 of hydrophobic material is less than or equal to 5 mm, making the bare fiber 1021 not easily be affected by surroundings and thus maintaining favorable quality of optical fibers.

Figure 10D:
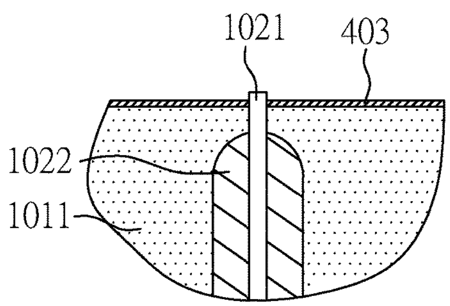
Figure 10E:
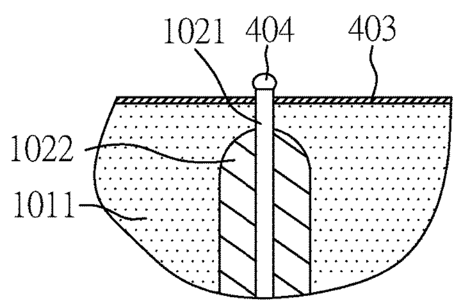

According to the present invention, after coating the layer 403 of hydrophobic material, in the grinding facility using a hard grinding disk to grind and remove the layer 403 of hydrophobic material at an end of the bare fiber 1021 so as to emerge the end of the bare fiber 1021, such that the status of FIG. 10D can be shown. Eventually, disposing an atomization facility 30, and atomizing lens material to the optical fiber assembly 102 so as to form a lens 404 on the optical fiber assembly 102 such that the lens 404 is then heated and solidified, such status is shown in FIG. 10E. Since the principle thereof is similar to the aforementioned, further description will be redundant.

Figure 11:
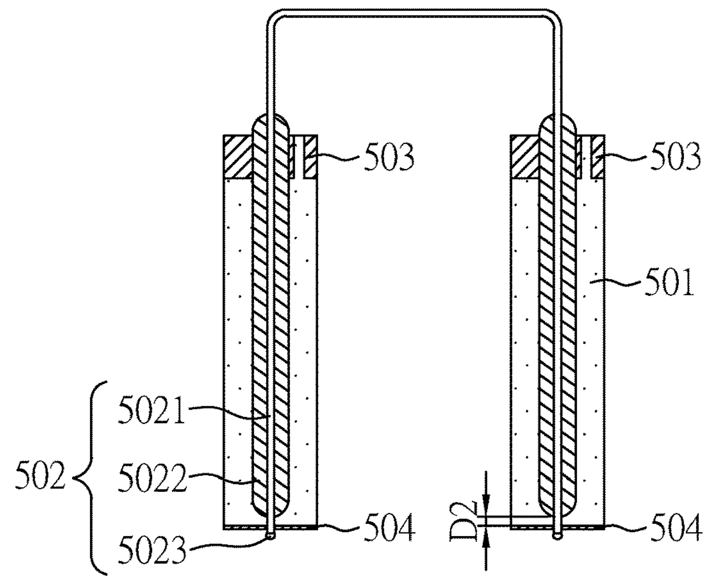
FIG. 11 is a cross-sectional view illustrating a first embodiment of an optical fiber connector according to the present invention.

Further referring to FIG. 11, a cross-sectional view illustrating a first embodiment of an optical fiber connector according to the present invention, the optical fiber connector comprises two plastic portions 501 and two optical fiber assemblies 502. Each of the plastic portions 501 bonds an upper plate 503 and a layer 504 of hydrophobic material. Each of the optical fiber assemblies 502 includes a bare fiber 5021, a protective layer 5022, and a lens 5023. The protective layer 5022 envelops the bare fiber 5021, and that the bare fiber 5021 emerges, at two ends, from the protective layer 5022, respectively. The bare fiber 5021 has its at least one end bonded with at least one lens 5023, such that the optical fiber assembly 502 has its at least one end had at least one lens 5023. The optical fiber assembly 502 has its two ends emerged from the plastic portion 501.

According to the present invention, the bare fibers 5021 of the optical fiber assemblies 502 located in the two plastic portions 501 are integrally connected together so as to form two optical fiber connectors of the same dimension. Besides, the material of an end of the plastic portion 501, adjacent to the lens 5023, is softer than the material of the other end of the plastic portion 501 farther from the lens 5023. Such a construction makes it easier for performing a grinding work during manufacturing. In addition, a distance D2 between the protective layer 5022 and the layer 504 of hydrophobic material is less than or equal to 5 mm, making the bare fiber 5021 not easily be affected by surroundings and thus maintaining favorable quality of optical fibers.

Figure 12:
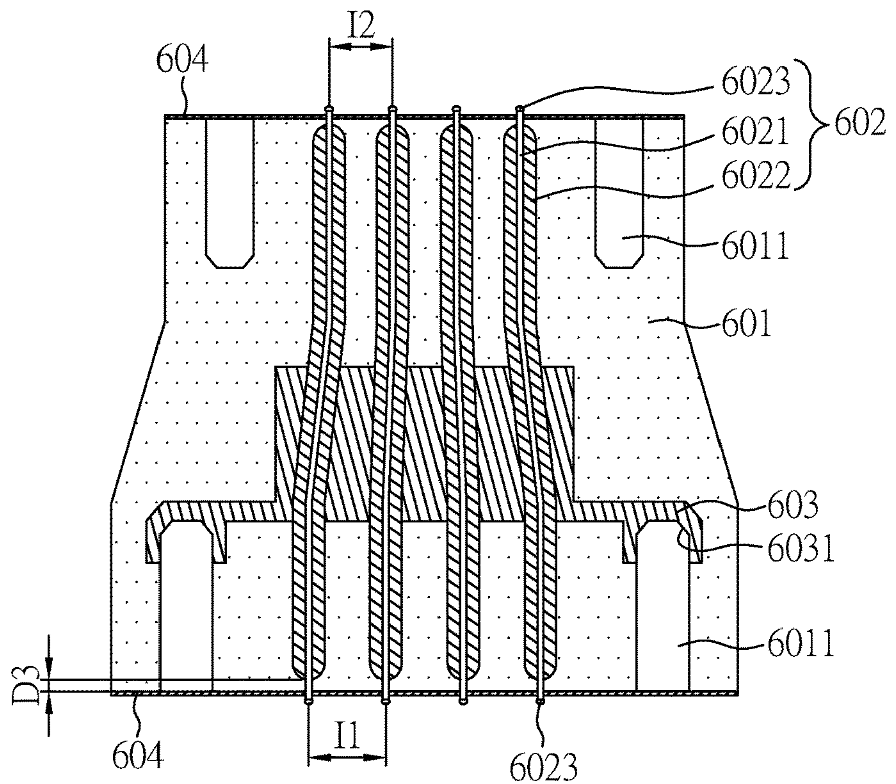
FIG. 12 is a cross-sectional view illustrating a second embodiment of the optical fiber connector according to the present invention.

Now referring to FIG. 12, a cross-sectional view illustrating a second embodiment of the optical fiber connector according to the present invention, the optical fiber connector comprises a plastic portion 601, four optical fiber assemblies 602, and a positioning unit 603. The plastic portion 601 is formed with four engaging concaves 6011 and is bonded with two layers 604 of hydrophobic material. Each of the optical fiber assemblies 602 includes a bare fiber 6021, a protective layer 6022, and two lenses 6023. The protective layer 6022 envelops the bare fiber 6021, and that the bare fiber 6021 emerges, at two ends, from the protective layer 6022, respectively. The bare fiber 6021 has its two ends bonded with the lens 6023, respectively, such that the optical fiber assembly 602 has its two ends had lenses 6023. The optical fiber assembly 602 has its two ends emerged from the plastic portion 601.

According to the present invention, the positioning unit 603 is formed with two slots 6031 for being bonded with the engaging concaves 6011. The positioning unit 603 is made either of metal, plastic, or ceramic, and reinforces strength of structure for the optical fibers disposed in optical fiber connectors, let alone the number of usage for plug-in and plug-out of optical fiber connectors can be increased.

Further, according to the present invention, the material of an end of the plastic portion 601, adjacent to the lens 6023, is softer than the material of the other end of the plastic portion 601 farther from the lens 6023. Such a construction makes it easier for performing a grinding work during manufacturing. In addition, a distance D3 between the protective layer 6022 and the layer 604 of hydrophobic material is less than or equal to 5 mm, making the bare fiber 6021 not easily be affected by surroundings and thus maintaining favorable quality of optical fibers. Further, the plastic portion 601 has, at its two ends, four lenses 6023, respectively, emerged therefrom. The lenses 6023 space from each other differently at two ends of the plastic portion 601, namely, the lenses 6023 at an end of the plastic portion 601 has a span I1, while a span I2 at the other end, so that the structural design can correspond to different specification requirements in two sides of the optical fiber connector.

Figure 13:
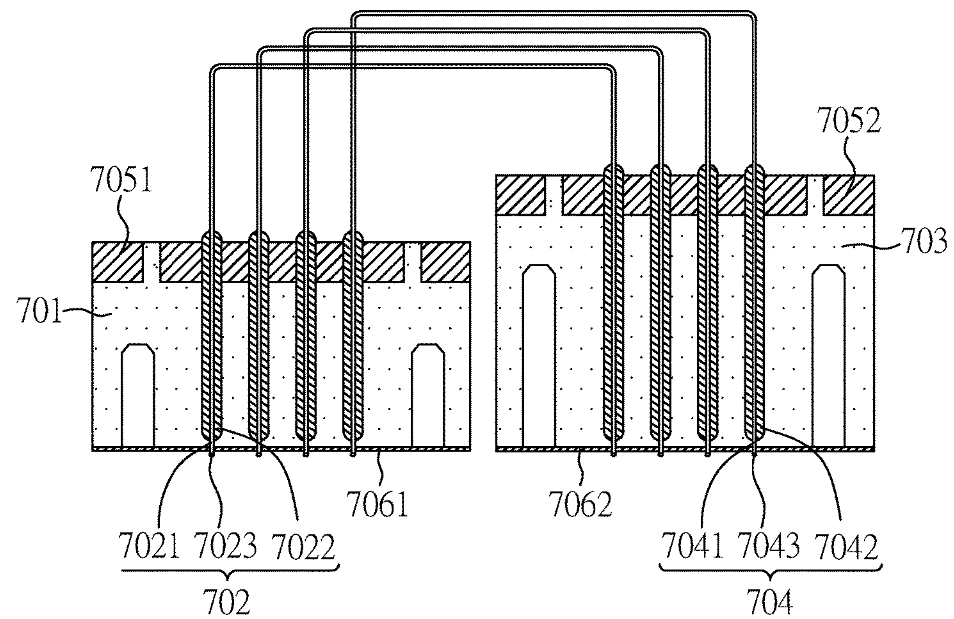
FIG. 13 is a cross-sectional view illustrating a third embodiment of the optical fiber connector according to the present invention.

Referring to FIG. 13, a cross-sectional view illustrating a third embodiment of the optical fiber connector according to the present invention, the optical fiber connector comprises a first plastic portion 701 having four optical fiber assemblies 702, and a second plastic portion 703 having four optical fiber assemblies 704. The first plastic portion 701 is bonded with an upper plate 7051 and a layer 7061 of hydrophobic material, and that the second plastic portion 703 with an upper plate 7052 and a layer 7062 of hydrophobic material. The optical fiber assemblies 702 each include a bare fiber 7021, a protective layer 7022, and a lens 7023; and that the optical fiber assemblies 704 each include a bare fiber 7041, a protective layer 7042, and a lens 7043.

According to the present invention, the feature lies in that the bare fibers 7021 of the optical fiber assemblies 702 of the first plastic portion 701 are each integrally and correspondingly connected with each of the bare fibers 7041 of the optical fiber assemblies 704 of the second plastic portion 703, respectively, so as to form two interconnected optical fiber connectors of different dimensions.

Figure 14:
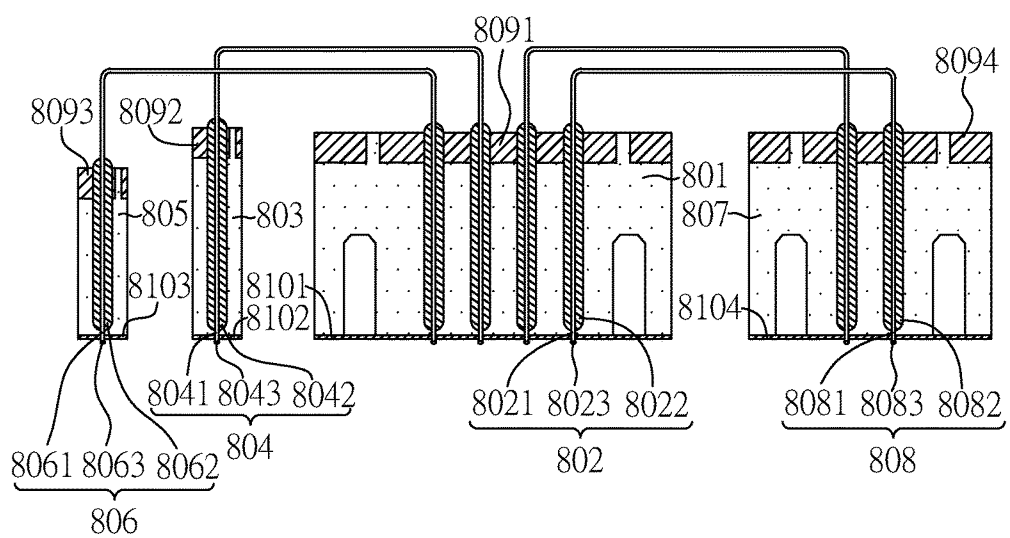
FIG. 14 is a cross-sectional view illustrating a fourth embodiment of the optical fiber connector according to the present invention.

Further referring to FIG. 14, a cross-sectional view illustrating a fourth embodiment of the optical fiber connector according to the present invention, the optical fiber connector comprises a first plastic portion 801 having four optical fiber assemblies 802, a second plastic portion 803 having an optical fiber assembly 804, a third plastic portion 805 having an optical fiber assembly 806, and a fourth plastic portion 807 having two optical fiber assemblies 808.

According to the present invention, the first plastic portion 801 is bonded with an upper plate 8091 and a layer 8101 of hydrophobic material, that the second plastic portion 803 with an upper plate 8092 and a layer 8102 of hydrophobic material, that the third plastic portion 805 with an upper plate 8093 and a layer 8103 of hydrophobic material, and that the fourth plastic portion 807 with an upper plate 8094 and a layer 8104 of hydrophobic material. The optical fiber assemblies 802 each include a bare fiber 8021, a protective layer 8022, and a lens 8023; that the optical fiber assembly 804 includes a bare fiber 8041, a protective layer 8042, and a lens 8043; that the optical fiber assembly 806 includes a bare fiber 8061, a protective layer 8062, and a lens 8063; and that the optical fiber assemblies 808 each include a bare fiber 8081, a protective layer 8082, and a lens 8083.

Further, according to the present invention, the feature lies in that the bare fibers 8021 of the optical fiber assemblies 802 of the first plastic portion 801 are each integrally and correspondingly connected with the bare fiber 8041 of the optical fiber assembly 804 of the second plastic portion 803, the bare fiber 8061 of the optical fiber assembly 806 of the third plastic portion 805, and each of the bare fibers 8081 of the optical fiber assemblies 808 of the fourth plastic portion 807, respectively, so as to form four interconnected optical fiber connectors of different dimensions.

Figure 15:
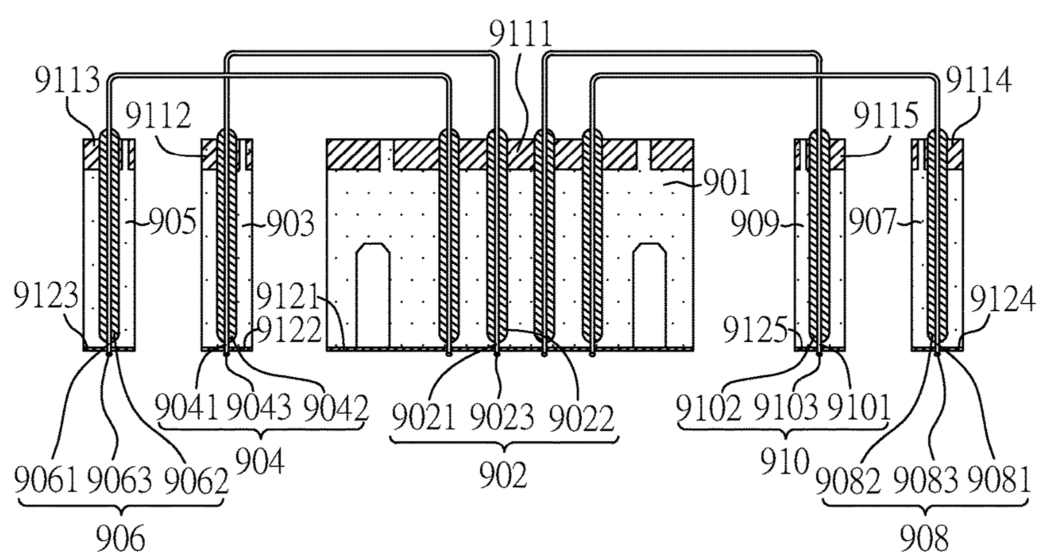
FIG. 15 is a cross-sectional view illustrating a fifth embodiment of the optical fiber connector according to the present invention.

Now referring to FIG. 15, a cross-sectional view illustrating a fifth embodiment of the optical fiber connector according to the present invention, the optical fiber connector comprises a first plastic portion 901 having four optical fiber assemblies 902, a second plastic portion 903 having an optical fiber assembly 904, a third plastic portion 905 having an optical fiber assembly 906, a fourth plastic portion 907 having an optical fiber assembly 908, and a fifth plastic portion 909 having an optical fiber assembly 910.

According to the present invention, the first plastic portion 901 is bonded with an upper plate 9111 and a layer 9121 of hydrophobic material, that the second plastic portion 903 with an upper plate 9112 and a layer 9122 of hydrophobic material, that the third plastic portion 905 with an upper plate 9113 and a layer 9123 of hydrophobic material, that the fourth plastic portion 907 with an upper plate 9114 and a layer 9124 of hydrophobic material, and that the fifth plastic portion 909 with an upper plate 9115 and a layer 9125 of hydrophobic material. The optical fiber assemblies 902 each include a bare fiber 9021, a protective layer 9022, and a lens 9023; that the optical fiber assembly 904 includes a bare fiber 9041, a protective layer 9042, and a lens 9043; that the optical fiber assembly 906 includes a bare fiber 9061, a protective layer 9062, and a lens 9063; that the optical fiber assembly 908 includes a bare fiber 9081, a protective layer 9082, and a lens 9083; and that the optical fiber assembly 910 includes a bare fiber 9101, a protective layer 9102, and a lens 9103

Further, according to the present invention, the feature lies in that the bare fibers 9021 of the optical fiber assemblies 902 of the first plastic portion 901 are each integrally and correspondingly connected with the bare fiber 9041 of the optical fiber assembly 904 of the second plastic portion 903, the bare fiber 9061 of the optical fiber assembly 906 of the third plastic portion 905, the bare fibers 9081 of the optical fiber assemblies 908 of the fourth plastic portion 907, and the bare fiber 9101 of the optical fiber assembly 910 of the fifth plastic portion 909, respectively, so as to form a combination of an optical fiber connector having four bare fibers and four optical fiber connectors having unitary bare fiber.

Figure 16:
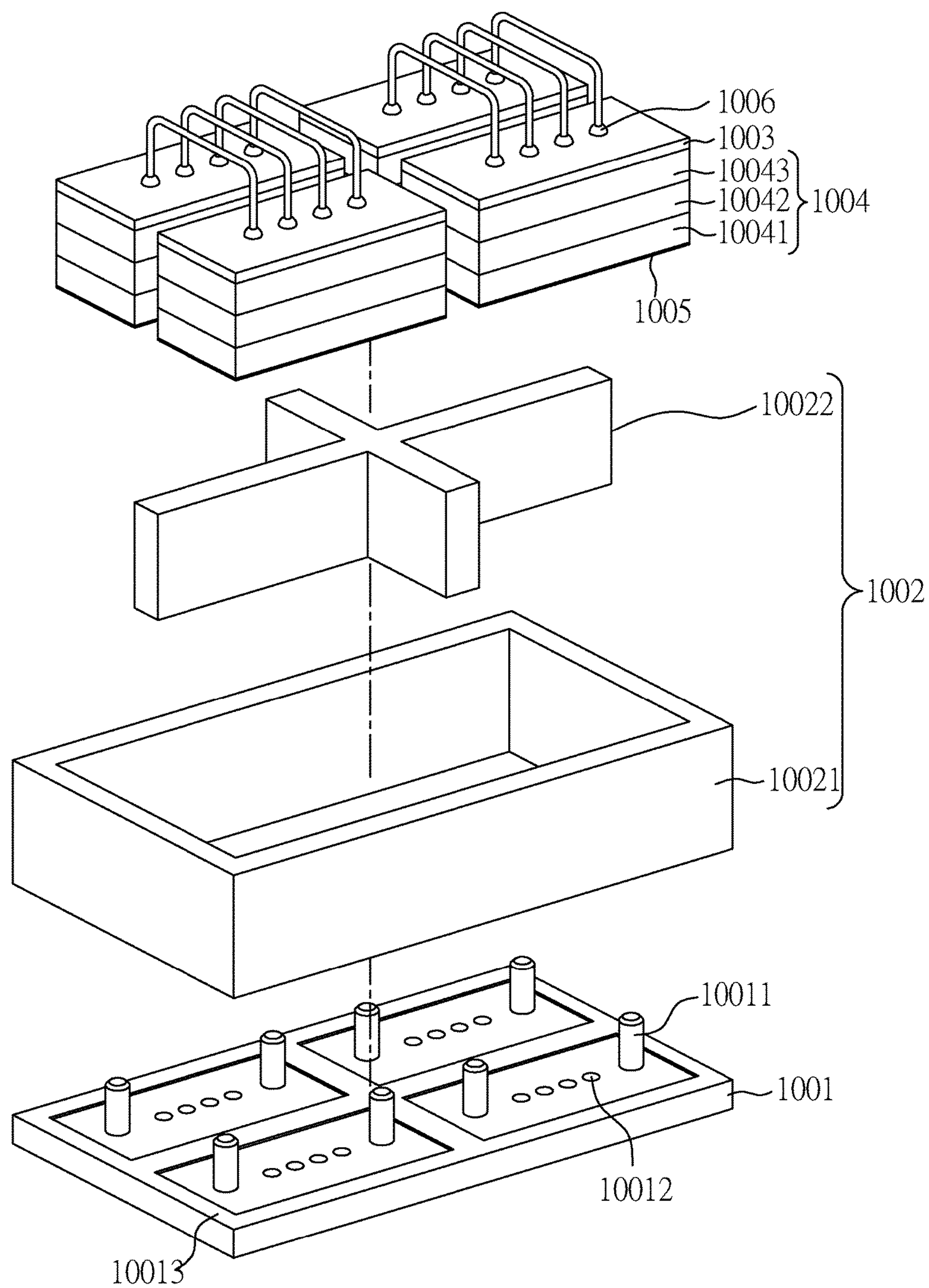
FIG. 16 is an exploded view illustrating an application of the first embodiment of the casting mold and the third embodiment of the optical fiber connector according to the present invention.

Further referring to FIG. 16, an exploded view illustrating an application of the first embodiment of the casting mold and the third embodiment of the optical fiber connector according to the present invention, the casting mold comprises a lower mold plate 1001 having a plurality of positioning pins 10011, a plurality of positioning slots 10012, and a protrusion 10013; a mold wall 1002 having an external mold wall 10021 and internal mold wall 10022; and a plurality of upper plates 1003.

According to the present invention, the optical fiber connector comprises an upper plate 1003, a plastic portion 1004, a layer 1005 of hydrophobic material, and four optical fiber assemblies 1006. The plastic portion 1004 includes a first plastic layer 10041, a second plastic layer 10042, and a third plastic layer 10043. The plastic portion 1004 is bonded with the layer 1005 of the hydrophobic material and the upper plate 1003. The first plastic layer 10041 and the third plastic layer 10043 relate to a mixture of soft fiber and plastic; while the second plastic layer 10042 relates to a mixture of hard fiber and plastic.

It is noted that suppose the casting cavities are fed with plastic of all the same material, then during grinding on surfaces (not shown) of the optical fiber assemblies 1006, the optical fiber assemblies 1006 will be recessed easily, resulting in a poor grinding effect. Therefore, according to the present invention, the first plastic layer 10041, the second plastic layer 10042, and the third plastic layer 10043 are cast with different materials such that the first plastic layer 10041, served as a grinding surface and relating to a mixture of soft fiber and plastic, can facilitate the grinding work.

Further, it is understood that plastic casting and solidification have been of quite well-known technical processes, and relevant knowledge can be available from published sources. As such, it is presumed that those skilled in this field are aware of the details.

According to the present invention, after plastic material has been cast into layers of the casting molds and formation completes, the lower mold plate 1001 can be removed. Then, meanwhile, grinding work, coating of layers 1005 of hydrophobic material, and atomization will be performed on ends (not shown) of the optical fiber assemblies 1006 in the casting cavities of the casting molds. And after the atomization work, the ends of the optical fiber assemblies 1006 are each heated and solidified so as to form a lens (not shown).

Thereafter, the external mold wall 10021 and the internal mold wall 10022 of the mold wall 1002 are removed so as to obtain products of the optical fiber connectors. FIG. 16 shows two optical fiber connectors, each comprising an upper plate 1003, a plastic portion 1004, a layer 1005 of hydrophobic material, and four optical fiber assemblies 1006.

Given the above, the method for making optical fiber connector and structure thereof, according to the present invention, are characterized by using innovative casting molds such that plural optical fiber connectors, of the same or different dimensions, can be made simultaneously. This will make the production of optical fiber connectors more efficient. Besides, through the positioning slots, the positioning portions, and the positioning units, accuracy of alignment for the optical fiber assemblies in the optical fiber connectors can be enhanced so as to increase reliability of automated production. Furthermore, the positioning units can reinforce strength of structure for the optical fibers disposed in optical fiber connectors, let alone the number of usage for plug-in and plug-out of optical fiber connectors can be increased.

Although the present invention has been explained in relation to its preferred embodiments, it is to be understood that many other possible modifications and variations can be made without departing from the scope of the invention as hereinafter claimed.

What is claimed is:

1. A method for making an optical fiber connector, comprising the following steps:

(A) Providing a casting mold having at least one casting cavity, and arranging at least one optical fiber assembly in the at least one casting cavity;

(B) Feeding plastic material into the at least one casting cavity;

(C) Solidifying the plastic material so as to form a plastic portion which solidifiedly bonds the at least one optical fiber assembly, where an end of the at least one optical fiber assembly emerges from the plastic portion, then removing a lower mold plate of the casting mold;

(D) Using a grinding disk to grind the end of the at least one optical fiber assembly; and (E) Disposing the casting mold into an atomization facility, and atomizing lens material to the end of the at least one optical fiber assembly so as to form a lens on the end of the at least one optical fiber assembly such that the lens is heated and solidified.

2. The method for making an optical fiber connector as claimed in claim 1, wherein the grinding disk of step (D) is a hard grinding disk, and wherein step (C) further includes grinding the end of the at least one optical fiber assembly with a soft grinding disk, thereafter coating a layer of hydrophobic material on a surface of the plastic portion adjacent to the end of the at least one optical fiber assembly, wherein a hardness of the soft grinding disk is lower than a hardness of the hard grinding disk.

3. The method for making an optical fiber connector as claimed in claim 2, wherein the casting mold includes:

the lower mold plate, including a plurality of positioning pins, at least one positioning slot, and a protrusion, wherein the at least one positioning slot has a positioning portion;

a mold wall, provided above the protrusion; and at least one upper plate, provided on the mold wall, and including at least one sprue and at least one optical fiber passage.

4. The method for making an optical fiber connector as claimed in claim 3, wherein the at least one casting cavity further includes a positioning unit provided on the plural positioning pins.

5. The method for making an optical fiber connector as claimed in claim 2, wherein the casting mold includes:

the lower mold plate, including at least one positioning slot and a protrusion, and the at least one positioning slot including a positioning portion;

a mold wall provided above the protrusion; and at least one upper plate, provided on the mold wall, and including at least one sprue and at least one optical fiber passage.

6. The method for making an optical fiber connector as claimed in claim 5, wherein the least one casting cavity further includes a positioning unit arranged on the mold wall.

7. The method for making an optical fiber connector as claimed in claim 2, wherein the casting mold includes:

the lower mold plate, including a plurality of bottom positioning pins, of bottom positioning slots, and a bottom protrusion, wherein the bottom positioning slots each have a positioning portion;

a trapezoidal mold wall, provided above the bottom protrusion;

at least one upper plate, provided on the trapezoidal mold wall, and including a plurality of top positioning pins, at least one sprue, a top protrusion, and of top positioning slots, wherein the top protrusion abuts against the trapezoidal mold wall, and the top positioning slots each having a top positioning portion; and at least one position unit, arranged on the plural bottom positioning pins.

8. The method for making an optical fiber connector as claimed in claim 1, wherein the atomization facility, provided with a hermetic space, comprises:

at least one atomization portion, arranged in and at the top of the atomization facility:

at least one rotating table, arranged in and at the bottom of the atomization facility; and a monitor, arranged inside the atomization facility, and through detecting the weight of liquid atomized on the monitor, the thickness of liquid atomized on an end of the at least one optical fiber assembly can be monitored.

9. The method for making an optical fiber connector as claimed in claim 1, wherein in step (B), the plastic material further includes a first plastic layer, a second plastic layer, and a third plastic layer formed, in sequence, in the at least one casting cavity, wherein the first plastic layer and the third plastic layer relate to a mixture of soft fiber and plastic, while the second plastic layer relates to a mixture of hard fiber and plastic, wherein a hardness of the mixture of soft fiber and plastic is lower than a hardness of the mixture of hard fiber and plastic.

10. The method for making an optical fiber connector as claimed in claim 9, wherein the at least one optical fiber assembly further includes a protective layer, wherein either at least one the protective layer or the plastic material is made of hydrophobic material.

* * * * *